United States Patent
Gunnink et al.

(10) Patent No.: US 10,792,893 B2
(45) Date of Patent: Oct. 6, 2020

(54) LAMINATE OF MUTUALLY BONDED ADHESIVE LAYERS AND METAL SHEETS, AND METHOD TO OBTAIN SUCH LAMINATE

(71) Applicant: GTM-Advanced Products B.V., s-Gravenhage (NL)

(72) Inventors: Jan Willem Gunnink, Nieuwerkerk aan den IJssel (NL); Simon Gunnink, Delft (NL)

(73) Assignee: GTM-Advanced Products B.V., 's-Gravenhage (NL)

( * ) Notice: Subject to any disclaimer, the term of this patent is extended or adjusted under 35 U.S.C. 154(b) by 159 days.

(21) Appl. No.: 15/760,385

(22) PCT Filed: Sep. 15, 2016

(86) PCT No.: PCT/NL2016/050636
§ 371 (c)(1),
(2) Date: Oct. 5, 2018

(87) PCT Pub. No.: WO2017/048122
PCT Pub. Date: Mar. 23, 2017

(65) Prior Publication Data
US 2019/0134949 A1    May 9, 2019

(30) Foreign Application Priority Data
Sep. 15, 2015    (NL) ...................................... 2015437

(51) Int. Cl.
*B32B 15/08*    (2006.01)
*B32B 5/12*    (2006.01)
(Continued)

(52) U.S. Cl.
CPC ................ *B32B 15/08* (2013.01); *B32B 3/02* (2013.01); *B32B 3/08* (2013.01); *B32B 3/10* (2013.01);
(Continued)

(58) Field of Classification Search
CPC ... Y10T 428/192; Y10T 428/197; B32B 3/08; B32B 7/14; B32B 15/08; B32B 15/14; B32B 15/20; B64C 1/12
(Continued)

(56) References Cited

U.S. PATENT DOCUMENTS

| 5,429,326 A | 7/1995 | Garesche et al. |
| 6,736,919 B1 | 5/2004 | Roebroeks |

(Continued)

FOREIGN PATENT DOCUMENTS

| EP | 2907654 A1 | 8/2015 |
| WO | 9853989 A1 | 12/1998 |

(Continued)

*Primary Examiner* — Alexander S Thomas
(74) *Attorney, Agent, or Firm* — The Webb Law Firm

(57) ABSTRACT

Described is a laminate, including a stack of mutually bonded adhesive layers and metal sheets. The laminate includes abutting and/or overlapping metal sheet edges that extend along a length direction within a splicing region. A splice strap is connected to the laminate at an outer surface of the laminate across said splicing region. The splice strap includes one layer of fiber-reinforced adhesive or of metal sheet, or stacked layers of fiber-reinforced adhesive and/or metal sheets. A widest splice strap layer is connected to the laminate over a transverse distance of at least 5 times the widest strap layer thickness, and the widest strap layer has a lower bending stiffness than the bending stiffness of one of the spliced metal sheets.

20 Claims, 8 Drawing Sheets

(51) Int. Cl.
| | |
|---|---|
| B32B 7/14 | (2006.01) |
| B32B 15/14 | (2006.01) |
| B32B 15/20 | (2006.01) |
| B32B 3/08 | (2006.01) |
| B64C 1/12 | (2006.01) |
| B32B 7/05 | (2019.01) |
| B32B 15/04 | (2006.01) |
| B32B 15/092 | (2006.01) |
| B32B 15/098 | (2006.01) |
| B32B 27/28 | (2006.01) |
| B32B 27/30 | (2006.01) |
| B32B 27/36 | (2006.01) |
| B32B 27/42 | (2006.01) |
| B32B 27/34 | (2006.01) |
| B32B 15/18 | (2006.01) |
| B32B 5/02 | (2006.01) |
| B32B 15/09 | (2006.01) |
| B32B 3/02 | (2006.01) |
| B32B 3/10 | (2006.01) |
| B32B 7/12 | (2006.01) |
| B32B 3/14 | (2006.01) |
| B32B 15/082 | (2006.01) |
| B32B 15/088 | (2006.01) |
| B32B 27/32 | (2006.01) |
| B64G 1/22 | (2006.01) |
| B64C 1/00 | (2006.01) |

(52) U.S. Cl.
CPC ............. *B32B 3/14* (2013.01); *B32B 5/02* (2013.01); *B32B 5/12* (2013.01); *B32B 7/05* (2019.01); *B32B 7/12* (2013.01); *B32B 7/14* (2013.01); *B32B 15/043* (2013.01); *B32B 15/082* (2013.01); *B32B 15/088* (2013.01); *B32B 15/09* (2013.01); *B32B 15/092* (2013.01); *B32B 15/098* (2013.01); *B32B 15/14* (2013.01); *B32B 15/18* (2013.01); *B32B 15/20* (2013.01); *B32B 27/28* (2013.01); *B32B 27/281* (2013.01); *B32B 27/285* (2013.01); *B32B 27/286* (2013.01); *B32B 27/30* (2013.01); *B32B 27/32* (2013.01); *B32B 27/34* (2013.01); *B32B 27/36* (2013.01); *B32B 27/42* (2013.01); *B64C 1/12* (2013.01); *B64G 1/22* (2013.01); *B32B 2250/42* (2013.01); *B32B 2250/44* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2307/50* (2013.01); *B32B 2307/51* (2013.01); *B32B 2307/54* (2013.01); *B32B 2307/546* (2013.01); *B32B 2307/552* (2013.01); *B32B 2307/714* (2013.01); *B32B 2307/732* (2013.01); *B32B 2605/00* (2013.01); *B32B 2605/18* (2013.01); *B64C 2001/0072* (2013.01); *Y10T 428/192* (2015.01); *Y10T 428/197* (2015.01)

(58) Field of Classification Search
USPC ............................................. 244/131
See application file for complete search history.

(56) References Cited

U.S. PATENT DOCUMENTS

| | | |
|---|---|---|
| 2007/0042214 A1 | 2/2007 | Rajabali et al. |
| 2015/0225061 A1 | 8/2015 | Beumler |
| 2017/0050411 A1 | 2/2017 | Rajabali |
| 2017/0080671 A1 | 3/2017 | Gunnink et al. |

FOREIGN PATENT DOCUMENTS

| | | |
|---|---|---|
| WO | 2005032805 A1 | 4/2005 |
| WO | 2015142170 A1 | 9/2015 |
| WO | 2015163764 A1 | 10/2015 |

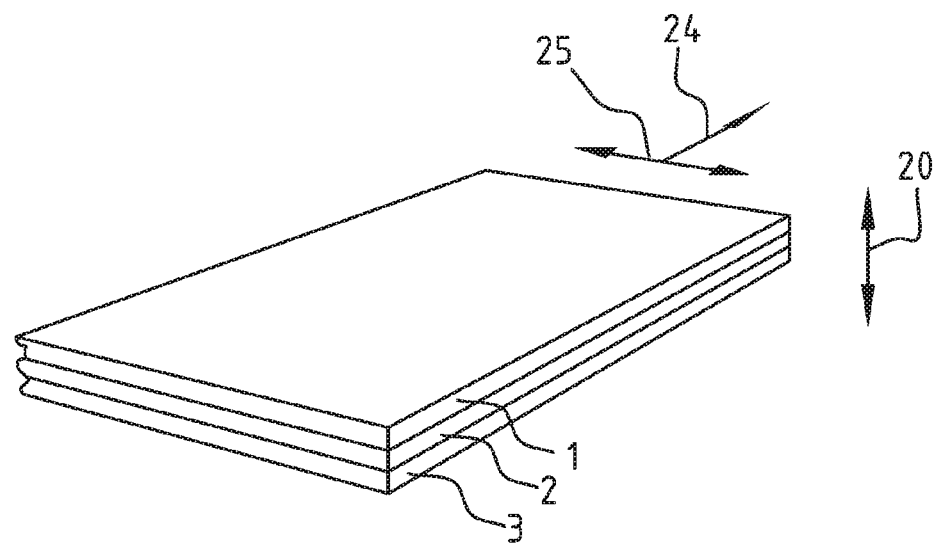
Prior Art  FIG. 1
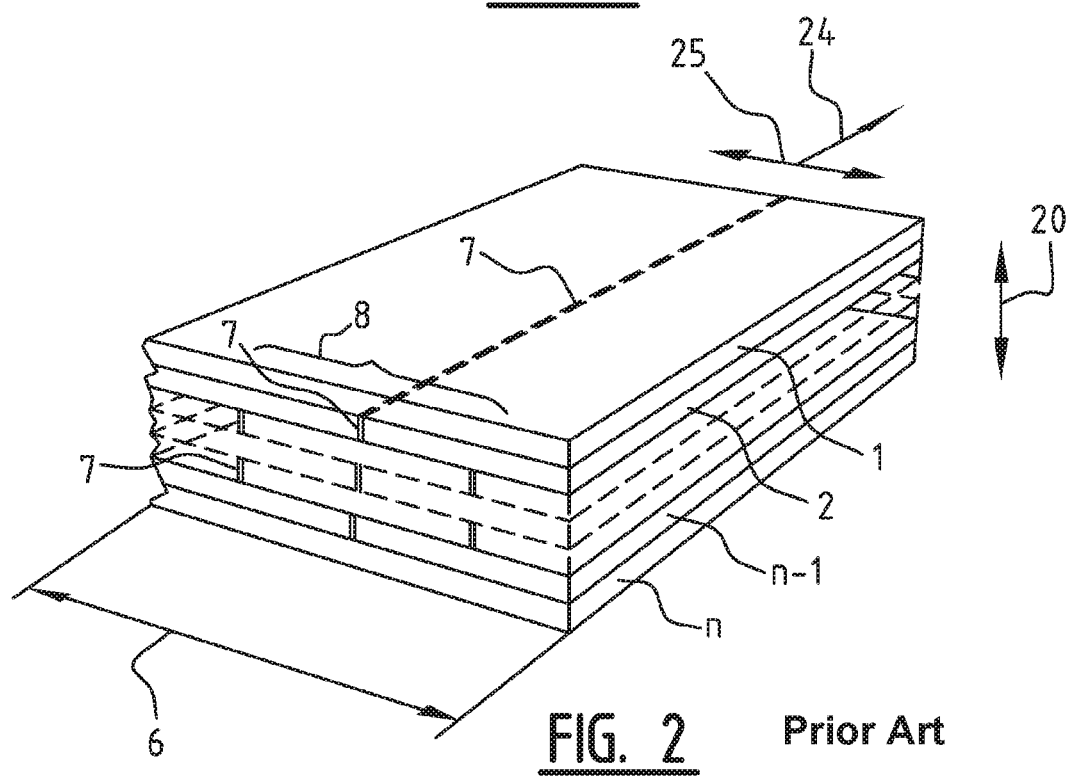
FIG. 2  Prior Art

LAMINATE OF MUTUALLY BONDED ADHESIVE LAYERS AND METAL SHEETS, AND METHOD TO OBTAIN SUCH LAMINATE

CROSS-REFERENCE TO RELATED APPLICATIONS

This application is the United States national phase of International Application No. PCT/NL2016/050636 filed Sep. 15, 2016, and claims priority to Dutch Patent Application No. 2015437 filed Sep. 15, 2015, the disclosures of which are hereby incorporated in their entirety by reference.

FIELD OF THE INVENTION

The invention relates to a laminate of mutually bonded adhesive layers and metal sheets with abutting and/or overlapping metal sheet edges, extending along a length direction within a splicing region of the laminate. The invention further relates to a method for obtaining such a laminate.

BACKGROUND ART

Laminates of mutually bonded adhesive layers and metal sheets are used for structural purposes, for instance in the aircraft industry. In order to obtain large panels of such laminates, and because metal sheets are available in limited widths only, typical laminates comprise abutting and/or overlapping metal sheet edges, extending along a length direction within a splicing region of the laminate.

A laminate comprising a splicing region is for instance known from U.S. Pat. No. 5,429,326, which discloses a laminated body panel for aircraft applications. The panel comprises at least two metal layers with a typical thickness of 0.3 mm, and an adhesive layer provided in between the metal layers. Some metal layers are composed of two or more metal sheets which are generally disposed coplanar in a layer and separated by a splice or splice line extending in a length direction of the laminate. Splices in a metal layer are typically staggered with respect to splices provided in other metal layers in order to prevent the laminate from weakening too much. Using splices in a laminate no longer restricts the maximum width of a laminate to a metal sheet width that is limited by present day metal sheet manufacturing technology.

EP 2 907 654 A1 discloses a laminate of mutually bonded adhesive layers and metal sheet layers, wherein at least one outer layer of the metal sheet layers comprises an overlap splice. The laminate is provided with a cover segment comprising at least one layer of reinforcement fibres and covering a region of the overlap splice. EP 2 907 654 A1 does not disclose any specific embodiments comprising specific reinforcing fibers and metal sheet alloys.

WO 98/53989 A1 discloses a laminate of mutually bonded adhesive layers and metal sheet layers, as well as a method for making such a laminate. The laminate comprises mutually overlapping metal sheets, whereby a metal sheet is bent towards the plane of another metal sheet.

In some laminates, the splice region of the laminate is covered with a splice strap or doubler to prevent exposure of the splices to environmental conditions, and to strengthen the laminate in a direction transverse to the length direction of the laminate.

The known laminate may suffer from internal stresses, for instance induced by their manufacturing process. The internal stresses may negatively affect strength and fatigue life of the laminate, which strength and fatigue life are an important design parameter, in particular for aircraft structures. The negative effects on strength and fatigue life may be worsened in laminates having relatively thick and/or stiff metal layers, in particular exceeding 0.3 mm for aluminum layers, and/or at relatively low temperatures below 0° C. and lower.

It is an object of the present invention to provide a laminate with an adequate strength and improved fatigue behavior, as well as a method for manufacturing such a laminate.

SUMMARY OF THE INVENTION

This and other objects are achieved by providing a laminate comprising a stack of mutually bonded layers of adhesive and metal sheets, the laminate comprising spliced metal sheets with abutting and/or overlapping metal sheet edges that extend along a length direction within a splicing region, wherein a splice strap is connected to the laminate at and over an outer surface of the laminate and extending in the length direction across said splicing region over a certain width in a transverse direction perpendicular to the length direction, the splice strap comprising one layer of fiber-reinforced adhesive or of metal sheet, or stacked layers of fiber-reinforced adhesive and/or metal sheets, wherein a widest splice strap layer is connected to the laminate over a transverse distance of at least 5 times the widest strap layer thickness, and the widest strap layer has a lower bending stiffness $(E^*t^3)_{strap\ layer}$ than the bending stiffness $(E^*t^3)_{spliced\ layer}$ of one of the spliced metal sheets $$(E^*t^3)_{strap\ layer} < (E^*t^3)_{spliced\ layer}$$

and wherein further $E_{strap\ layer} > 10$ GPa.

The bending stiffness of a strap layer is defined as the product of the tensile elastic modulus and the thickness to the power 3 of the strap layer. The bending stiffness of the widest strap layer and of the at least one spliced metal sheet may be calculated from dimensions (the thickness, or average thickness in case of a varying thickness) and material properties (the tensile elastic modulus). The tensile elastic modulus is determined according to well known practices and is for instance given in data sheets. The bending stiffness of a widest fiber-reinforced adhesive layer concerns the bending stiffness of the substantially fully cured fiber-reinforced adhesive layer.

The laminate in accordance with the invention has an improved fatigue life. An improved fatigue life, in the context of the present application means a larger number of load cycles up to crack initiation and/or failure at a certain load. The splicing region in the laminate is defined as that region of the laminate wherein splice lines between abutting metal sheets and/or overlapping edge parts occur in at least one of the outer metal sheet layers of the laminate. The splicing region in a transverse direction (perpendicular to the length direction) of the laminate extends across abutting edges of metal sheets or across at least one edge of a metal sheet that overlaps with another metal sheet. The adhesive layer between metal sheets is preferably continuous through the splicing region and therefore bridges splice lines and the like. A spliced layer in the laminate comprises two abutting metal sheets and/or two metal sheets with overlapping edge parts. According to the invention, the bending stiffness of the splice strap layer is lower than the bending stiffness of one of the abutting and/or overlapping metal sheets, preferably lower than the metal sheet having the lowest bending stiffness.

The splice strap extends across the splicing region, by which is meant that the width of the splice strap covers at least the width of the splicing region or a part of the width of the splicing region. The wording 'substantially' in the context of the present inventions means at least 90% of the indicated variable or subject.

Connecting the splice strap to the laminate may be achieved by any means such as by mechanical means or by an adhesive. Any adhesive may be used, including the same adhesive as that used in the adhesive layers of the laminate. Such adhesive may be applied as a separate layer. The strap bonding adhesive layer may also be provided with reinforcing fibers, if desired. It is also possible that the strap layer comprises a fiber reinforced adhesive layer, for instance in the form of a prepreg. Such splice strap may be bonded to the laminate as such, and the adhesive within the splice strap will partly form the adhesive layer connecting the splice strap to the laminate.

Although the bending stiffness of the widest splice strap layer may be taken in any direction of the widest splice strap layer, the laminate according to an embodiment of the invention is characterized in that the bending stiffness of the widest splice strap layer and spliced metal sheet is the bending stiffness in the transverse direction, i.e. the direction perpendicular to the direction in which the splice extends.

The bending stiffness of the widest splice strap layer may be affected by the layer thickness, or by the modulus of elasticity E of the widest splice strap layer material. In a preferred embodiment, the thickness of the widest splice strap layer may be chosen to be below the thickness of one of the spliced metal sheets. In another preferred embodiment, the modulus of elasticity E of the widest splice strap layer is chosen to be lower than the modulus of elasticity of one of the spliced metal sheets.

In an embodiment of the invention, a laminate is provided wherein $(E*t^3)_{strap\ layer} < 0.9\ (E*t^3)_{spliced\ layer}$, more preferably $(E*t^3)_{strap\ layer} < 0.75\ (E*t^3)_{spliced\ layer}$, and most preferably $(E*t^3)_{strap\ layer} < 0.50\ (E*t^3)_{spliced\ layer}$.

The splice strap in useful embodiments comprises a metal strip, for instance made from the same metal as the laminate metal sheets. In accordance with another embodiment of the invention, a laminate is provided wherein the splice strap comprises stacked splice strap layers, preferably of fiber-reinforced adhesive, in another embodiment of metal sheets, and in yet another embodiment of a combination of mutually bonded metal sheets and fiber-reinforced adhesive layers. The stacking sequence of the splice strap can be provided outside-in or, preferably, inside-out; meaning respectively that the smallest layer is adjacent to the laminate, or the widest strap layer is adjacent to the laminate An embodiment of the invention is characterized in that the widest splice strap layer is connected to the laminate over a transverse distance of at least 10 times the widest strap layer thickness. In case the splice strap comprises one layer only, the widest splice strap corresponds to this one strap layer.

The strap may comprise a number of strap layers, of which one is the widest splice strap layer. In such an embodiment, less wide strap layers may be closer to the laminate's outer surface than the widest strap layer. The widest strap layer may thus be connected to the laminate at its sides only, for instance symmetrically with respect to its central extension. The widest splice strap layer is then connected to the laminate over a transverse distance of at least 5 times the widest strap layer thickness at both sides of the splice strap layer.

The strap may also comprise a number of strap layers of equal width. In this case, all the strap layers can be considered as the widest strap layer, and the stiffness and other requirements than apply to the complete strap. For instance, the bending stiffness in such case is the bending stiffness of the complete strap.

According to the invention, a widest splice strap layer is connected to the laminate over a transverse distance of at least 5 times the widest strap layer thickness. In more preferred embodiments, a widest splice strap layer is connected to the laminate over a transverse distance of at least 10 times the widest strap layer thickness, even more preferred over at least 25 times the widest strap layer thickness, even more preferred over at least 50 times the widest strap layer thickness, even more preferred over at least 80 times the widest strap layer thickness, even more preferred over at least 100 times the widest strap layer thickness, and most preferred over at least 200 times the widest strap layer thickness. Other preferred embodiments relate to a laminate, wherein the widest splice strap layer is connected to the laminate over a transverse distance of at most 500 times the widest strap layer thickness, more preferably over at most 400 times the widest strap layer thickness, and most preferred over at most 300 times the widest strap layer thickness.

Another embodiment of the invention comprises a laminate wherein the tensile strength $P_{strap}$ of the total strap layer is equal to or larger than 0.6 times the tensile strength $P_{spliced\ layer}$ of one of the spliced metal sheets: $P_{strap} \geq 0.6*P_{spliced\ layer}$. A particularly preferred embodiment relates to a laminate that further comprises spliced metal sheets with overlapping metal sheet edges.

Another embodiment of the invention comprises a laminate wherein the tensile strength $P_{strap}$ of the total strap layer is equal to or larger than the tensile strength $P_{spliced\ layer}$ of one of the spliced metal sheets: $P_{strap} \geq 1.0*P_{spliced\ layer}$, and more preferred $P_{strap} \geq 1.2*P_{spliced\ layer}$. A particularly preferred embodiment relates to a laminate that further comprises spliced metal sheets with abutting metal sheet edges.

The tensile strenghts $P_{strap}$ and $P_{spliced\ layer}$ are defined as ultimate forces per unit of width (dimensions MPa·mm). In case the strap layer comprises stacked sheets of metal and of fiber reinforced composite layers, the strength of the strap is given by:

$$P_{strap} = \Sigma(TUS*t_m)_{metal\ layers} + \Sigma(TSC*t_c)_{composite\ layers}$$

wherein:
  TUS=tensile strength of the metal layer(s)
  $t_m$=thickness of the metal layer(s)
  TSC=tensile strength of the composite layer(s)
  $t_c$=thickness of the composite layer(s)

In case the strap layer has a varying total thickness, the tensile strength $P_{strap}$ is evaluated at the thickest part. When thickness is varied by building up the number of layers in the splice strap, $P_{strap}$ is evaluated by the above formula in which the maximum number of metal and composite layers is used.

Another embodiment of the invention relates to a laminate wherein the bending stiffness $(E*t^3)_{spliced\ layer}$ of one of the spliced metal sheets is lower than 90 GPa mm³, more preferably lower than 65 GPa mm³. A particularly preferred embodiment relates to a laminate that further comprises spliced metal sheets with overlapping metal sheet edges. The limitation to the bending stiffness in the present embodiment effectively means that the thickness of the spliced metal sheets is limited for a certain metal sheet elastic modulus $E_{metal\ layer}$, as follows:

$$t_{spliced\ layer} < C_f*(1/E_{spliced\ layer})^{1/3}$$

wherein $C_f$=4.5, more preferably 4.

This embodiment is found to further reduce local stress peaks arising in the area of overlap, as well as being beneficial to producing the spliced laminate.

In a particularly preferred laminate according to an embodiment of the invention, the splice strap comprises a metal sheet layer that is connected to the laminate with a layer of fiber-reinforced adhesive.

A particularly useful embodiment offers a laminate wherein the splice strap layers each have a width in the transverse direction across the splicing region, and the width of the layers decreases over the splice strap thickness towards the laminate to form staggered layers. In another embodiment, the splice strap layers each have a width in the transverse direction across the splicing region and the width of the layers increases over the splice strap thickness towards the laminate to form staggered layers.

The splice strap layers may be staggered on one or both sides of the splice strap to provide a splice strap with staggered edges. In an embodiment of the invention, the laminate is characterized in that the splice strap layers are staggered on each side of the splice strap by a length of at least 5 times the widest strap layer thickness, and more preferably by a length of at least 10 times the widest strap layer thickness.

The splice strap according to the invention may be provided in the form of one solid plate, bonded to the laminate. A useful embodiment offers a laminate wherein the splice strap comprises a tapered edge over a tapered transverse distance, and a virtual splice strap with a thickness equal to the mean thickness across the tapered transverse distance has a lower bending stiffness than the bending stiffness of one of the spliced metal sheets.

In another embodiment, a laminate is provided wherein the splice strap comprises a staircase edge over a staircased transverse distance, and a virtual splice strap with a thickness equal to the thickness of the widest stair has a lower bending stiffness than the bending stiffness of one of the spliced metal sheets.

A splice strap with tapered edges may have a continuously tapered edge, for instance linear, and/or a continuous variable edge, for instance parabolic. It is also possible to provide staircased edges, the staggered edges then showing discontinuities.

In a further embodiment, the splice strap layers each have a width in the transverse direction across the splicing region, and the width of the layers is equal over the splice strap thickness, wherein the splice strap (the assembly of all bonded splice strap layers) has a lower bending stiffness than the bending stiffness of one of the spliced metal sheets.

The splice strap extends in the transverse direction of the laminate across at least a part of the splicing region. However, in some embodiments, the splice strap may extend across the splicing region or even beyond the splicing region. In further embodiments, the splice strap may even extend in the transverse direction of the laminate over substantially the complete laminate width.

The modulus of elasticity of the widest splice strap layer $E_{strap\ layer}$ has to be >10 GPa in order to provide the desired effect. Preferably, $E_{strap\ layer}$>15 GPa, more preferably >20 GPa, and most preferably >25 GPa.

According to the invention, a laminate may be provided wherein an outer surface of the splice strap protrudes from the outer surface of the laminate by an off-set thickness, for instance ranging from 0% to more than 100% of the splice strap thickness. In a preferred embodiment, the off-set thickness is 0 (zero), and the outer surface of the splice strap is flush with the outer surface of the laminate. In such embodiment, the splice strap is embedded in the laminate and a substantially smooth outer surface of the laminate ensues. In embodiments having a non-zero off-set thickness, the splice strap protrudes from an outer surface of the laminate in the splicing region and a discontinuous outer surface of the laminate ensues in the splicing region. This will in particular embodiments provide a ridge that extends in the length direction of the laminate.

An improved embodiment of the invention relates to a laminate that further comprises a bonded second splice strap extending in the length direction across said splicing region and positioned within the laminate stack. Preferably, the second splice strap is positioned adjacent to the spliced metal sheets and at a side of the spliced metal sheets that is opposite to the outer surface of the laminate.

The bending stiffness of the second splice strap is in general not subject to any limitation, but a preferred embodiment relates to a laminate wherein the bending stiffness of the second splice strap is also lower than the bending stiffness of one of the spliced metal sheets.

The laminate according to the invention in some embodiments needs to accommodate a splice strap and/or overlapping metal sheet edges in the thickness direction. In order to provide a smooth continuous outer surface of the laminate, some metal sheets then are provided with a lower thickness or need to be deformed. A useful embodiment of the invention therefore provides a laminate wherein the splicing region comprises deformed metal sheets.

In embodiments wherein the splice strap extends substantially parallel to the length direction of the laminate, the deformed metal sheets are preferably bend along a line parallel to the length direction.

Deforming metal sheets in the laminate may produce a laminate wherein, in an embodiment, the outer surface of the laminate is substantially smooth and a second outer surface opposite said outer surface is curved. The outer surface is then typically used as outbound surface of an aircraft component for instance, whereas the curved second outer surface is used as inbound surface of the aircraft component. The inbound surface may typically be covered with interior cladding and the like.

The adhesive layers in the laminate and/or the splice strap for some embodiments may be used as such. Preferred embodiments of the invention however provide a laminate and/or splice strap wherein the adhesive layers comprise reinforcing fibers to form a fiber-metal laminate and/or splice strap.

The laminates according to the present invention preferably comprise from 0 to 50 metal layers and about 1 to 49 adhesive layers. The metal layers may have any thickness such as the relatively thin metal layers of the prior art spliced laminates. Metal sheet thicknesses of between 0.1 and 2 mm may be used. The metal sheets in the present invention preferably have a thickness of more than 0.2 mm, more preferably more than 0.3 mm, and most preferably more than 0.8 mm.

The splice strap according to the invention preferably comprises from 0 to 8 metal layers and/or from 0 to 8 fiber-reinforced adhesive layers. The layers may have any thickness as long as the requirements set forth herein.

The metal sheets are preferably made from a metal having a tensile strength of more than 200 MPa. Examples of suitable metals are aluminum alloys, steel alloys, titanium alloys, copper alloys, magnesium alloys, and aluminum matrix composites. Aluminum-copper alloys of the AA2000 series, aluminum manganese alloys of the AA3000 series, aluminum-magnesium alloys of the AA5000 series, aluminum-zinc alloys of the AA7000 series, and aluminum-magnesium-silicon alloys of the AA6000 series are preferred. Some particularly preferred alloys are AA2024 aluminum-copper, AA5182 aluminum alloy, AA7075 aluminum-zinc, and AA6013 aluminum-magnesium-silicon. When improved corrosion resistance is desired, a sheet of AA5052 alloy or AA5024, AA5083 or AA5182 alloy may be included in the laminate. The laminates may also comprise metal sheets of a different alloy. Other useful alloys comprise aluminum-lithium alloys, such as AA2090, AA2098, and AA2198 alloys.

The adhesive layers of the laminate and/or splice strap are in preferred embodiments provided with reinforcing fibers. The fibers of the splice strap preferably bridge the splice lines and metal sheet edge overlaps and therefore are continuous across the splicing region. The reinforcing fibers may be oriented in one direction or in several different directions, depending on the loading conditions of the laminate structure. At least half of the reinforcing fibers preferably extend in the transverse direction, i.e. perpendicular to splice lines and/or lines of overlapping metal sheet edges. Preferred reinforcing fibers comprise continuous fibers made of glass, aromatic polyamides ("aramids"), carbon, and/or polymeric fibers such as PBO for instance. Preferred glass fibers include S-2, S-3 and/or R-glass fibers, as well as carbonized silicate glass fibers, although E-glass fibers are also suitable. Preferred fibers have a modulus of elasticity of between 60 and 650 GPa, and an elongation at break of between 0.1 and 8%, preferably above 1.6%, more preferably above 2.0%, and most preferably above 3.0%

The adhesive layers preferably comprise synthetic polymers. Suitable examples of thermosetting polymers include epoxy resins, unsaturated polyester resins, vinyl ester resins, and phenolic resins. Suitable thermoplastic polymers include polyarylates (PAR), polysulphones (PSO), polyether sulphones (PES), polyether imides (PEI), polyphenylene ethers (PEE), polyphenylene sulphide (PPS), polyamide-4,6, polyketone sulphide (PKS), polyether ketones (PEK), polyether ether ketone (PEEK), polyether ketoneketone (PEKK), and others. The laminate and/or splice strap may be provided with additional adhesive in certain areas, apart from the adhesive present in the adhesive layers. The thickness of the adhesive layers may be similar to that of the metal sheets but adhesive layers in the laminate and/or splice strap are preferably thinner.

The reinforcing fibers in the laminate and/or splice strap layers may be provided in the form of prepregs, an intermediate product of reinforcing fibers embedded in a partly cured thermosetting resin or in a thermoplastic polymer. Typically fiber volume fractions range from 15 to 75%, and more preferably from 20 to 65% of the total volume of adhesive and reinforcing fiber in the adhesive layers. The effective fiber volume fraction in an adhesive layer may be lowered by adding plain adhesive layers to reinforced adhesive layers.

The laminate in accordance with the invention may be manufactured by a method that comprises the steps of providing a forming substrate with an upper surface; providing a splice strap on the upper surface of the forming substrate, the splice strap extending over part of the forming substrate in a length direction across a splicing region; providing a stack of at least one adhesive layer and metal sheets, of which edges extend along the length direction and abut and/or overlap within the splicing region, the stack extending beyond the boundaries of the splice strap; the splice strap having a smaller thickness than a thickness of a metal sheet, positioned adjacent to the splice strap in the stack; and applying heat and pressure to the thus obtained stack.

Metal sheets may deform across the splicing region during the application of heat and pressure, and the deformed shape may be consolidated. The shape may be consolidated by curing the thermosetting resin in the adhesive layers, or by lowering the temperature below the melt temperature of a thermoplastic polymer in case such polymer is used in the adhesive layers. The metal sheets will bend towards the splice strap. The metal sheets may be deformed elastically (below the elastic limit) and/or may be deformed plastically (beyond the plastic limit). Which type of deformation prevails depends on the type of metal used, on shape and dimensions, on manufacturing conditions, and more.

In useful embodiments of the invention, a splice strap comprises stacked layers of fiber-reinforced adhesive. Several of such layers are preferably applied to the forming substrate on top of each other to build up thickness.

Another aspect of the invention finally relates to a structural component for a vehicle, spacecraft, or aircraft, comprising a laminate according to one of the described embodiments, and in particular to an aircraft comprising such a laminate.

BRIEF DESCRIPTION OF THE FIGURES

The invention will now be further elucidated on the basis of the exemplary embodiments shown in the figures, without however being limited thereto. The same or similar elements in the figures may be denoted by the same or similar reference signs. In the figures:

FIG. 1—is a view in perspective of a fiber-metal laminate according to the state of the art;

FIG. 2—is a view in perspective of a fiber-metal laminate according to the state of the art;

DETAILED DESCRIPTION OF EXEMPLARY EMBODIMENTS

Figure 3:
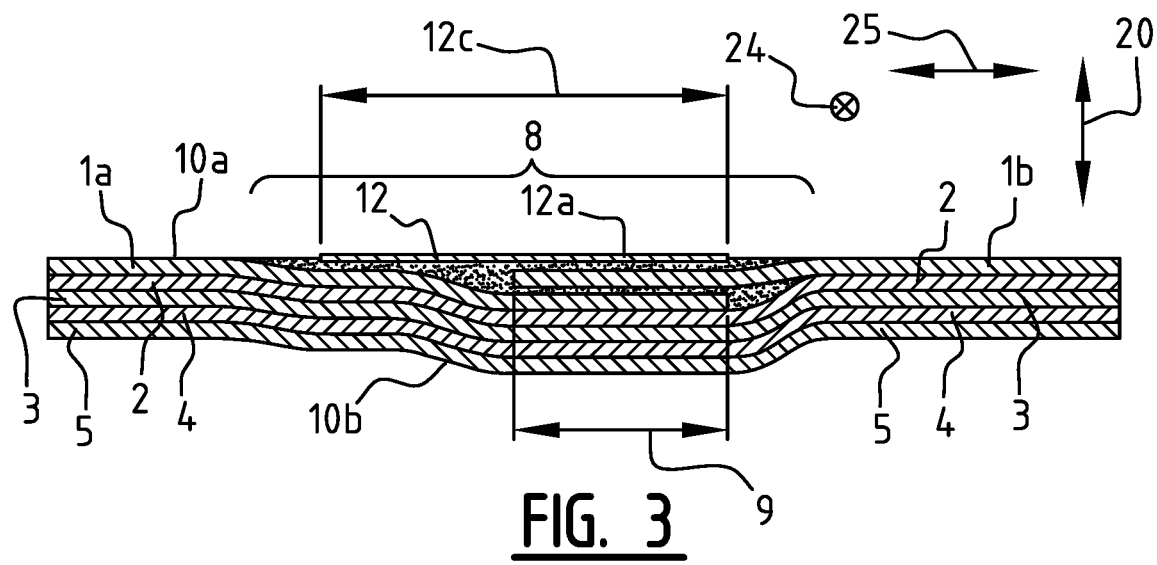
FIG. 3—is a cross-sectional view in a transverse direction of a fiber-metal laminate according to an embodiment of the present invention.

With reference to FIG. 1, a fiber-metal laminate according to the state of the art is shown. The laminate has a total number of three layers, of which layers 1 and 3 comprise a metal layer and layer 2 comprises a fiber-reinforced adhesive layer. Alternatively, layer 1 and 3 may comprise a fiber-reinforced adhesive layer and layer 2 a metal layer. Layers 1 and 3 may comprise the same metal alloy or may be built from a different kind of metal alloy. The fiber-reinforced adhesive layers may contain fibers in multiple directions as well as different fiber types. The laminate is typically built by providing a forming substrate, providing a first layer 3 on the forming substrate and stacking layers 2 and 1 on top of layer 3 to produce a stack of layers 1-3, which stack is then consolidated under the application of heat and pressure into a cured laminate.

As shown in FIG. 2, a fiber-metal laminate may comprise more layers up to a layer n, where n may range from 4 to more than 30 for instance. The outer layers 1 and n may be metal layers and/or fiber-reinforced adhesive layers. In the laminate, metal layers generally alternate with fiber-reinforced adhesive layers. Metal layers may be built from one metal sheet having a width in a transverse direction 25 that is sufficiently large to cover the entire width 6 of the laminate. As shown in FIG. 2, metal sheets may not be available in widths covering the entire width 6 of the laminate, and metal layers may have to be built up of at least two metal sheets with abutting metal sheet edges that form a splice 7, extending along a length direction 24 of the laminate within a splicing region 8 of the laminate (an extension of one splice line only is shown in FIG. 2 for clarity reasons and as minimum coverage area of the strap). As shown in FIG. 3, the at least two metal sheets may also comprise overlapping edge parts within a splicing region 8.

Referring now to FIGS. 3-7, several embodiments of the invented laminate are shown.

The fiber-metal laminate of FIG. 3 comprises a stack of 2 fiber-reinforced adhesive layers (2, 4) and three metal sheets (1, 3, 5). The metal sheets (1, 3, 5) are bonded to the adhesive layers (2, 4) by the adhesive present in the adhesive layers (2, 4). Outer metal sheet layer 1 is composed of two metal sheets (1a, 1b), edge parts whereof mutually overlap over a distance 9. The overlapping edges extend along the length direction 24 within a splicing region 8. According to the invention, a splice strap 12 is bonded to the laminate 10 at an outer surface 10a of the laminate 10 and extends in the length direction 24 within or across said splicing region 8.

The splice strap 12 is made of metal, in casu an aluminum alloy, and has a lower bending stiffness than that of the spliced metal sheets (1a, 1b). It is connected over a distance 12c that is larger than 5 times its thickness. Splice strap 12 could also be made of a fiber reinforced adhesive layer, having also a lower cured bending stiffness than that of one of the spliced metal sheets (1a, 1b).

As shown in FIG. 3, an outer surface 12a of the splice strap 12 protrudes from the outer surface 10a of the laminate 10 by an off-set thickness which is about half the thickness of the splice strap 12. The outer surface 10a of the laminate is substantially smooth—apart from the slightly protruded splice strap 12—and a second outer surface 10b opposite said outer surface 10a is curved. A substantially smooth outer surface 10a is preferred for aircraft components from an aerodynamics point of view. To accommodate the overlapping edge parts of sheets (1a, 1b) as well as the splice strap 12, and still produce a substantially smooth or flat outer surface 10a, may in some embodiments require that metal sheets are deformed in the splicing region 8. In particular, as shown, metal sheets are bent along a line parallel to the length direction 24 towards the splice strap 12 and/or overlapping edge parts. The splice strap 12 extends over a width 12c which encompasses the splice region. At the left hand of the splice strap 12, the splice strap 12 extends further than the end of layer 1b, whereas at the right hand of the splice strap 12, the splice strap 12 extends equally far as the layer 1a. In other preferred embodiments however, the right side of the splice strap 12 may extend further than the layer 1a.

Figure 4:
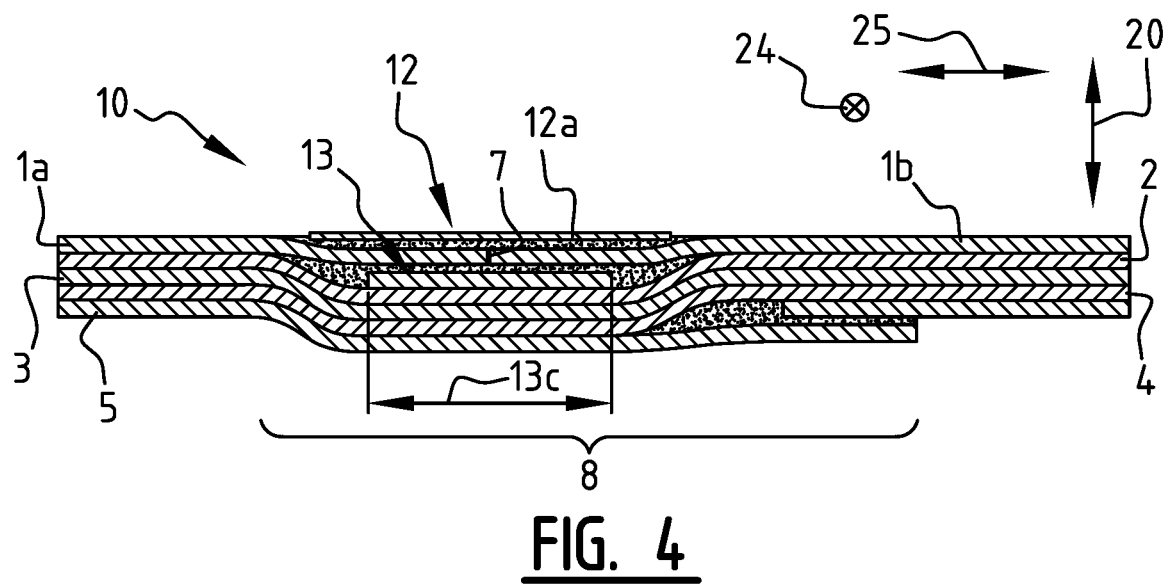
FIG. 4—is a cross-sectional view in a transverse direction of a fiber-metal laminate according to another embodiment of the present invention.

Another useful embodiment of a fiber-metal laminate 10 is shown in FIG. 4 and comprises a bonded second splice strap 13 positioned within a stack of 2 fiber-reinforced adhesive layers (2, 4) and three metal sheets (1, 3, 5). The second splice strap extends in the length direction 24 across said splicing region 8, just as a splice strap 12 provided at the outer surface 10 a of the laminate 10 extends in the length direction 24 across said splicing region 8. The respective widths (12c (see FIG. 3), 13c) of both splice straps (12, 13) need not be the same, as shown. Outer metal layer 1 is composed of two spliced metal sheets (1a, 1b), edge parts whereof abut to form a splice line 7, extending along the length direction 24 within a splicing region 8. The aluminum splice strap 12 has a lower bending stiffness than the bending stiffness of the spliced metal sheets (1a, 1b). The second aluminum splice strap 13 is positioned adjacent to the spliced metal sheets (1a, 1b) but at a side of the spliced metal sheets (1a, 1b) that is opposite to the outer surface 10a of the laminate 10. The second splice strap 13 in other words is positioned directly below the abutting end parts of metal sheets (1a, 1b). Its bending stiffness is lower than the stiffness of the spliced metal sheets (1a, 1b). Instead of aluminum sheets also fiber reinforced layers or combinations can be applied as splice strap having the same requirements.

Figure 5:
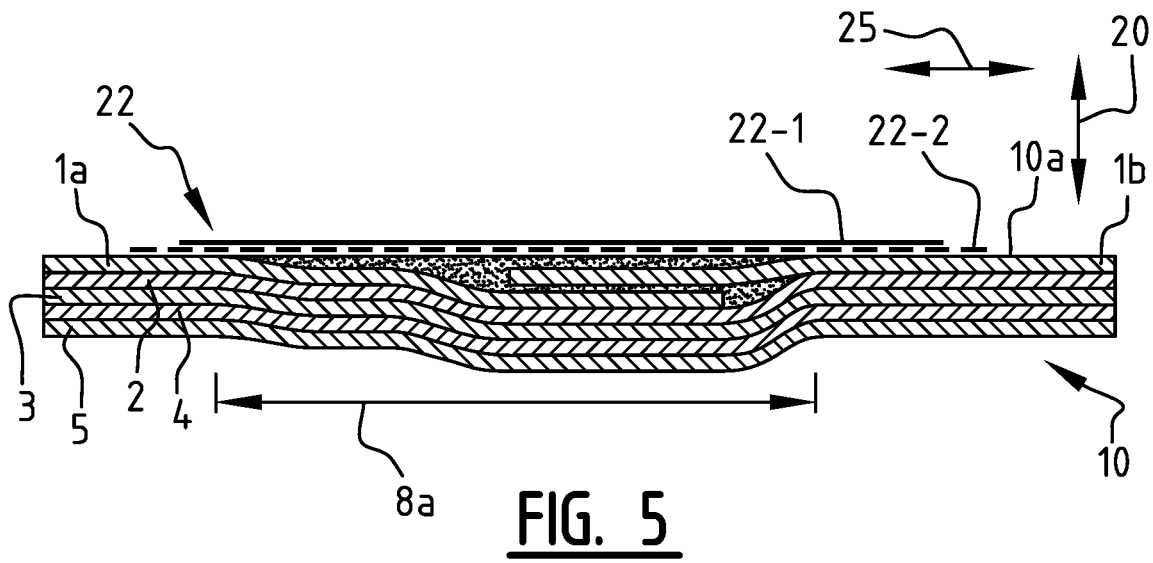
FIG. 5—is a cross-sectional view in a transverse direction of a fiber-metal laminate according to yet another embodiment of the present invention.

Yet another useful embodiment of a fiber-metal laminate 10 is shown in FIG. 5. The laminate 10 comprises a splice strap 22 bonded to an outer surface 10a of the laminate, which comprises a stack of 2 fiber-reinforced adhesive layers (2, 4) and three metal sheets (1, 3, 5). The strap 22 extends in the length direction 24 across a splicing region 8a. Outer metal layer 1 comprises two metal sheets (1a, 1b), an edge part of sheet 1a overlapping with an edge part of sheet 1b. The splice strap 22 comprises two layers (22-1, 22-2) of fiber-reinforced adhesive (prepreg), whereby the layer 22-2 in contact with the outer surface 10a extends over a larger width than the outermost layer 22-1 of the splice strap 22. According to the invention, the bending stiffness of the widest layer 22-2 (after cure) is lower than the bending stiffness of the metal sheets (1a, 1b). Further, it is connected to the outer surface 10a of the laminate 10 over a distance that is larger than 5 times the thickness of layer 22-2. In this embodiment, an outer surface the splice strap 22 protrudes from the outer surface 10a with an off-set thickness. However, the splice strap 22 may also be flush with the outer surface 10a of the laminate 10. Layer 22-1 can also be a metal sheet.

Figure 6:
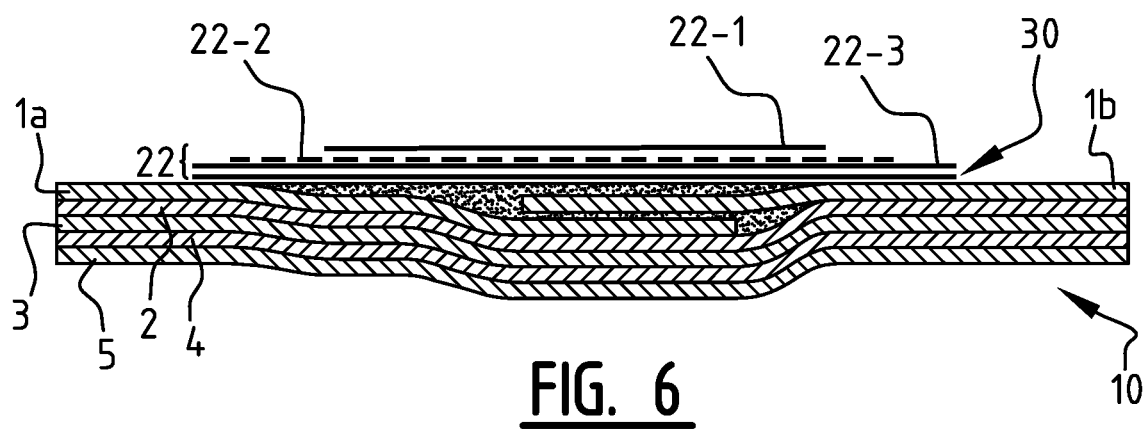
FIG. 6—is a cross-sectional view in a transverse direction of a fiber-metal laminate according to yet another embodiment of the present invention.

Yet another useful embodiment is shown in FIG. 6. The splice strap 22 in this embodiment comprises stacked layers (22-1, 22-2, 22-3), bonded to the laminate 1 by an additional adhesive layer 30. Fiber-reinforced adhesive layers 22-1, 22-2 are bonded to a metal sheet layer 22-3 by co-curing the layers. The adhesive layer 30 has a modulus of elasticity of lower than 10 GPa. According to the invention, the bending stiffness of layer 22-3 is lower than the bending stiffness of the metal sheets (1a, 1b). Further, it is connected to the outer surface of the laminate 10 over a distance that is larger than 5 times its thickness. The layers (22-1, 22-2, 22-3) of the splice strap 22 each have a width across the splicing region and the width of the layers (22-1, 22-2, 22-3) is seen to increase towards the laminate. Although the splice strap 22 is seen to protrude from the outer surface 10a with an off-set thickness, the splice strap 22 may also be flush with the outer surface 10a of the laminate 10.

Figure 7:
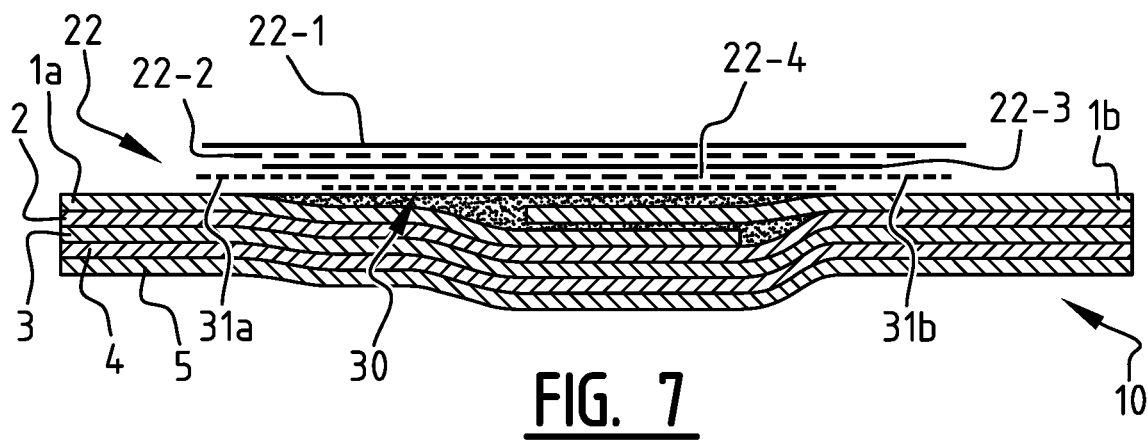
FIG. 7—is a cross-sectional view in a transverse direction of a fiber-metal laminate according to yet another embodiment of the present invention.

Another embodiment of a laminate according to the invention is shown in FIG. 7. The splice strap 22 in this embodiment comprises stacked layers (22-1, 22-2, 22-3) of fiber-reinforced adhesive, bonded to another metal sheet layer 22-4. The layers (22-1, 22-2, 22-3, 22-4) of the splice strap 22 each have a width across the splicing region and the width of the layers (22-1, 22-2, 22-3, 22-4) is seen to decrease towards the laminate. The splice strap 22 is bonded to the laminate 10 by an additional adhesive layer 30, and two adhesive layers (31, a, 31b) for bonding the largest width layer 22-1 to the laminate 10. According to an embodiment of the invention, the bending stiffness of layers 22-4 and in particular widest layer 22-1 is lower than the bending stiffness of the metal sheets (1a, 1b). Widest layer 22-1 is further connected over a distance that is larger than 5 times its thickness. This distance is equal to the difference in width of layers 22-1 and 22-2. Although the splice strap 22 is seen to protrude from the outer surface 10a with an off-set thickness, the splice strap 22 may also be flush with the outer surface 10a of the laminate 10. Also 22-1 can be a metal, 22-2 can be fibre reinforced metal layer; 22-3 can be a metal layer and layer 22-4 can be a fibre reinforced adhesive layer.

Figure 8:
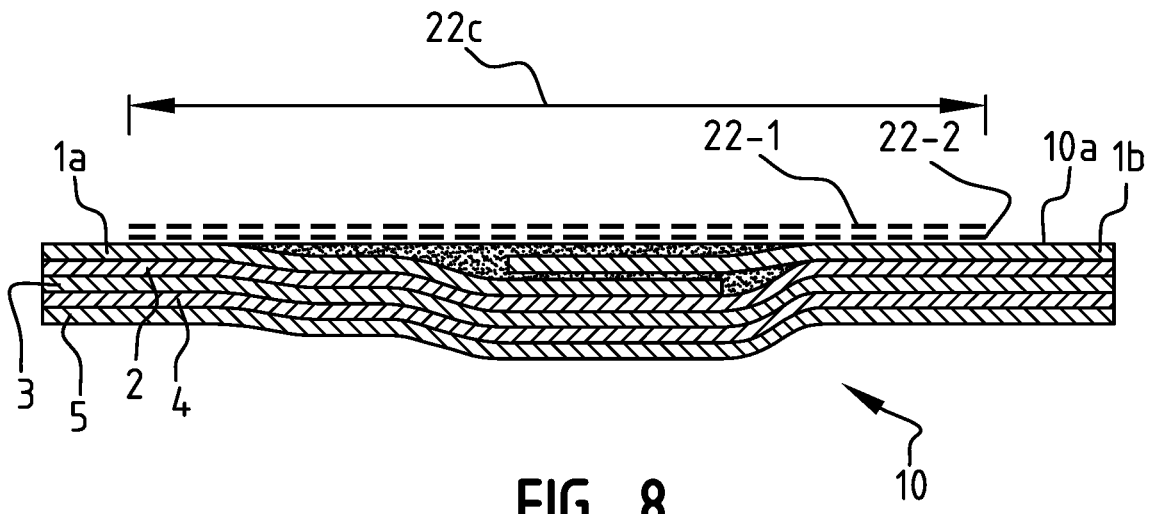
FIG. 8—is a cross-sectional view in a transverse direction of a fiber-metal laminate according to yet another embodiment of the present invention.

Another embodiment of a laminate according to the invention is shown in FIG. 8. The splice strap 22 in this embodiment comprises two stacked layers (22-1, 22-2) of fiber-reinforced adhesive in the form of prepregs. The splice strap 22 is bonded to the laminate 10 by the adhesive that is part of the prepreg of layer 22-2 and that partly flows out of the prepreg during cure. This embodiment does not require an additional adhesive layer for bonding to the laminate. The layers (22-1, 22-2) of the splice strap 22 in the embodiment shown have an equal width 22c across the splicing region. According to such embodiment of the invention, the bending stiffness of the combined layers 22-1 and 22-2 (after cure) is lower than the bending stiffness of the metal sheets (1a, 1b). Although the splice strap 22 is seen to protrude from the outer surface 10a with an off-set thickness, the splice strap 22 may also be flush with the outer surface 10a of the laminate 10.

Figure 9:
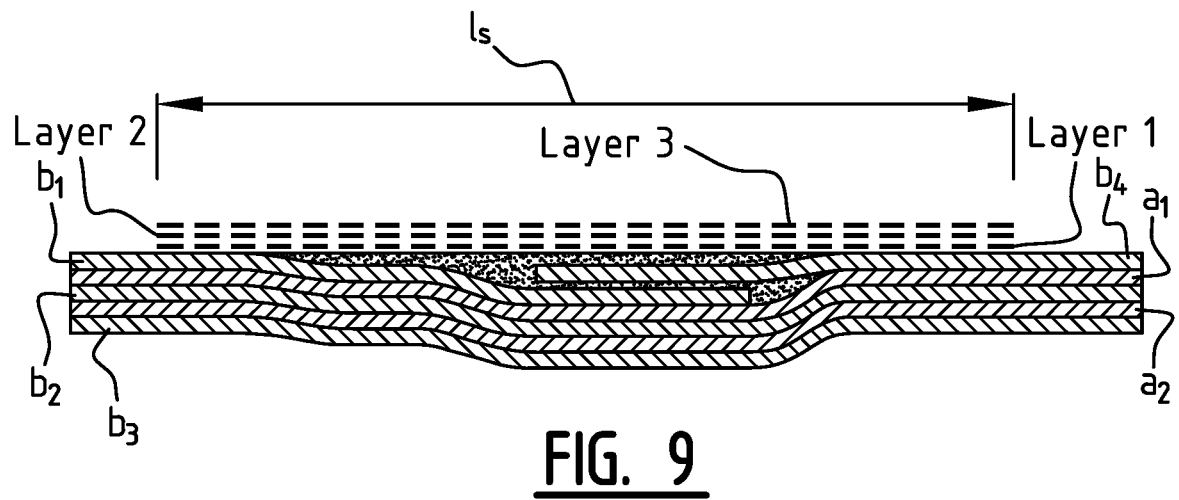
FIG. 9—is a cross-sectional view in a transverse direction of a fiber-metal laminate according to yet another embodiment of the present invention.

FIG. 9 shows a basic spliced laminate with 3 metal layers ($b_1$, $b_2$, $b_3$, $b_4$; where $b_1$ and $b_4$ are spliced) of an aluminum alloy 2024-T3 ($E_{metal}$=72.4 GPa) and $b_1$=$b_2$=$b_3$=0.3 mm), and each metal layer of the basic laminate is bonded with an adhesive layer ($a_1$ and $a_2$). This adhesive layer may contain reinforcing fibers. On top of the splice region is positioned a splice strap with 3 fiber reinforced layers (Layer 1, Layer 2, Layer 3) of the same length $l_s$. All 3 layers of the splice strap are the same and comprise unidirectional (UD) glass fibers ($E_{fibre}$=88 GPa) having a fiber volume content of 57%. The glass fibers are embedded in a matrix resin ($E_{matrix}$=5000 MPa). The resulting elongational stiffness of each of the layers therefore is $E_{layer}$=52.3 GPa). Each layer of the splice strap has the same cured thickness of t=0.13 mm. Since all 3 layers of the splice have the same width $l_s$ the total thickness of the splice is preferably taken into account to meet the requirements of the invention ($E_{metal}*t_{metal}^3$)>($E_{splice}*t_{splice}^3$). Therefore $E_{splice}$=$E_{layer}$ and $t_{splice}$=3*$t_{layer}$=3*0.13 mm=0.39 mm. Consequently ($E_{metal}*t_{metal}^3$)=1954.8 MPa*mm$^3$ and ($E_{splice}*t_{splice}^3$)= 3103 MPa*mm$^3$, which shows that this configuration is not meeting the requirements of the invention and therefore is part of the prior art.

Figure 10:
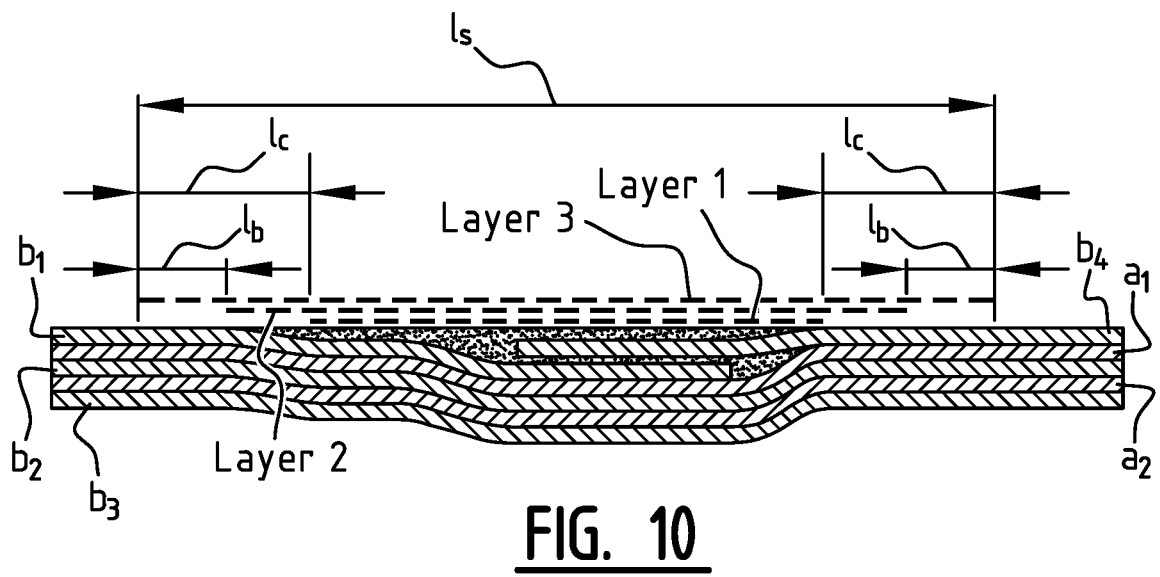
FIG. 10—is a cross-sectional view in a transverse direction of a fiber-metal laminate according to yet another embodiment of the present invention.

FIG. 10 shows a laminate in accordance with an embodiment of the invention. Having the same basic laminate, as well as the same splice strap as in FIG. 9, the width of the 3 layers of the splice strap differ in length. Layer 3 of the splice strap has a width of $l_s$, Layer 2 has a width of ($l_s$−2*$l_b$) and Layer 1 has a width of ($l_s$−2*$l_c$). The length of $l_b$=10 mm and of $l_c$=20 mm. In order to meet the requirements of the invention, the overlaps of the outer layer (Layer 3) are connected to one of the outer metal sheets (b1, b4) of the basic spliced laminate over a distance $l_b$ of at least 5 times the thickness of Layer 3, i.e. at least 0.65 mm. Furthermore Layer 3 needs to fulfill the stiffness requirements of the invention; i.e. ($E_{metal}*t_{metal}^3$)>($E_{Layer\ 3}*t_{Layer\ 3}^3$). This requirement is fulfilled since ($E_{Layer\ 3}*t_{Layer\ 3}^3$)=115 MPa*mm$^3$ and ($E_{metal}*t_{metal}^3$)=1954.8 MPa*mm$^3$. Layer 1 is also meeting the stiffness requirements of the invention.

Figure 11:
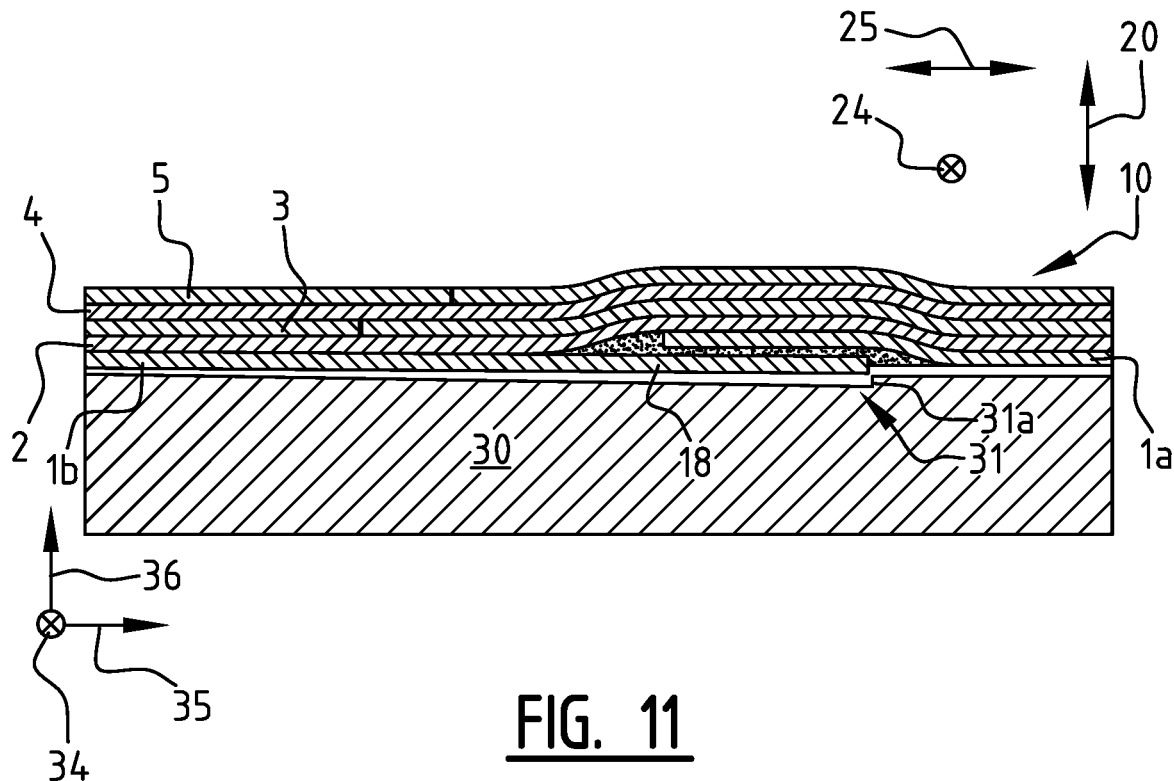
FIG. 11—is a cross-sectional view in a transverse direction of an assembly of a forming substrate and a fiber-metal laminate, illustrating an embodiment of a method for manufacturing the laminate.
Figure 12:
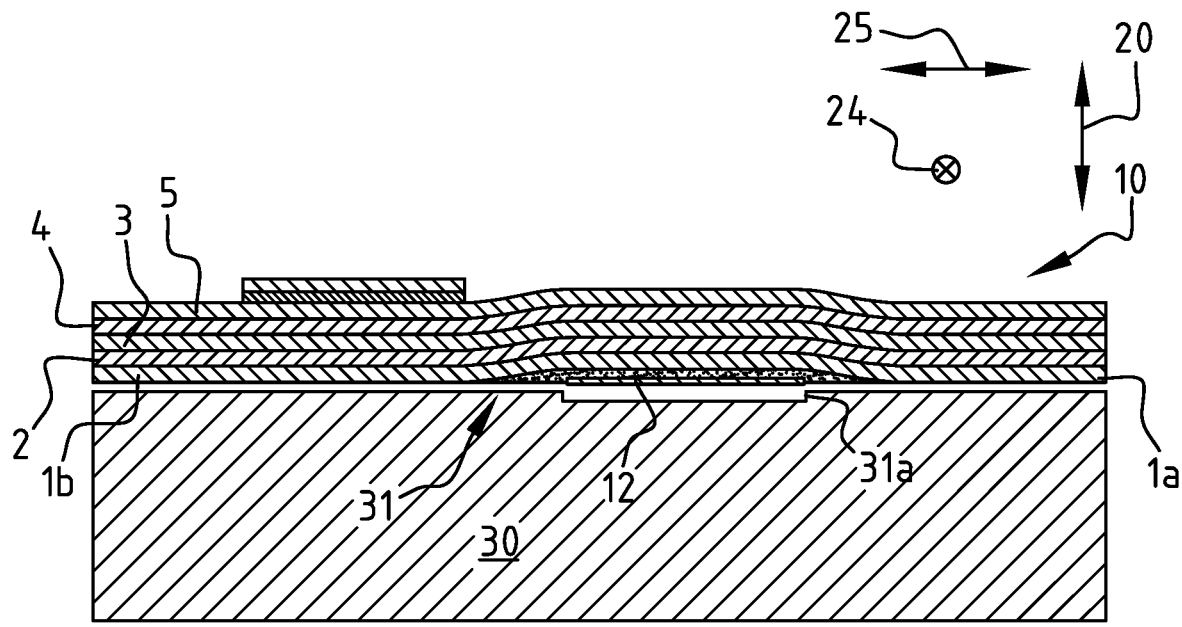
FIG. 12—is a cross-sectional view in a transverse direction of an assembly of a forming substrate and a fiber-metal laminate, illustrating an embodiment of a method for manufacturing another laminate according to the invention.

A method for making a laminate 10 in accordance with the present invention is illustrated in FIGS. 11 and 12. The method comprises providing a forming substrate 30 extending in a transverse direction 35, a thickness direction 36 and a length direction 34, and provided with a shape defining upper surface 31. The upper surface 31 of the forming substrate 30 comprises a recess 31a which extends in the length direction 34 of the forming substrate 30 across a splicing region for accommodating a splice strap (12, 18). In FIG. 11, the recess gradually builds up from an upper surface 31 outside the splicing region to achieve a final recess depth 31a at a discontinuous end line. The shape of the recess 31 mirrors the shape of the protruded part 18 of the metal sheet 1b of the laminate 10 of FIG. 6. In FIG. 12, the recess is provided in the upper surface 31 as a constant thickness trough 31a, which of course mirrors the shape of the splice strap 12 of the laminate of FIG. 3 or 4.

In the embodiment of FIG. 11, a first metal sheet 1b is then provided onto the tapered upper surface 31 of the forming substrate 30 such that an end part 18 thereof abuts against the upstanding end wall of the recess 31a. In the embodiment of FIG. 12, a metal or fiber-reinforced adhesive splice strap 12 is provided on the upper surface of the recess 31a within the confines of the recess 31a, the first metal sheet 1b and the splice strap 12 extending over part of the forming substrate 30 in the length direction 34 across a splicing region. A stack of three metal sheets (1, 3, 5) and two adhesive layers (2, 4) is then applied on top of the first metal sheet 1b (FIG. 11) or the splice strap 12 (FIG. 12). Edges of the metal sheets (1, 3, 5) extend along the length direction 34 and abut and/or overlap within the splicing region, and the stack (1-5) extends beyond the boundaries of the splice strap 12 or tapered metals sheet section 18. Heat and pressure are then applied to the thus obtained stack (1-5), in which process metal sheets (1a, 1b, 3, 5) deform across the splicing region. The deformed shape is then consolidated by curing a thermosetting adhesive in the fiber-reinforced adhesive layers (2, 4), or by cooling down a thermoplastic adhesive in the fiber-reinforced adhesive layers (2, 4). As shown, the metal sheets (1, 3, 5) are elastically bent over the splice strap 12 (FIG. 12) or first metals sheet portion 18, since metal sheets (1, 3, 5) are forced to take on the shape of the splice strap 12 or first metal sheet portion 18, provided in the recess 31a of forming substrate 30.

Heating and applying pressure may be achieved in a press or alternatively using an autoclave. Conventional pressure and heat levels may be used, for instance 4-10 bar at 120-175° C. The splice straps 12 and metal sheets (1a, 1b) may if desired be subjected to a degreasing treatment followed by etching or anodizing, and a primer may be applied onto the surface of the forming substrate. Although the forming substrate in the examples has a substantially flat upper surface, it does not need to be flat, and may for instance be shaped as the mirror image of a single- or double-curved body panel for an aircraft, or may have other shapes. The laminate is in particular applied in structural components for a vehicle spacecraft, or aircraft.

EXAMPLES

Calculation of Parameters

Calculation of the claimed parameters is illustrated by reference to the laminate of FIG. 15. The basic laminate is a laminate with 3 layers of titanium, whereby each layer has a thickness $t_{ti}$=0.8 mm. The outside layer is butt spliced at critical location 7. The titanium layers are bonded together by a metal adhesive. The applied titanium Ti-6Al-4V has a TUS=923 MPa. The strength of the spliced metal layer therefore is given by:

$P_{spliced\ layer}$=923*0.8=738.4 MPa mm

The strap over the critical location 7 consists of 4 layers. These layers are positioned symmetrically over the critical location 7 with increasing width towards the outside of the structure. The overlap is at each side minimally $5*t_{layer\ i}$. Therefore:

$0.5(b-a)\geq 5*t_{layer\ 2}, 0.5(c-b)\geq 5*t_{layer\ 3}$ and $0.5(d-c)\geq 5*t_{layer\ 4}$ Layer 1 and layer 3 are UD CFRP layers with a fibre strength of 4,000 MPa and a fiber volume fraction FVF of 50% and a composite layer with a of thickness $t_c$=0.15 mm and layers 2 and 4 are aluminium 2024-T3 layers with a thickness of $t_{alu}$=0.4 mm. The TSC of the CFRP layers will be determined hereunder and the TUS of aluminium 2024-T3=440 MPa.

To determine the strength of the strap at critical location 7 it will be essential to determine the strength of the metal parts as well as the strength of the composite parts.

The strength of the metal parts is:

$\Sigma(TUS*t_m)_{metal\ layers}$=440*0.4*2=352 MPa

The strength of the composite parts is determined as follows:

Each composite layer has a FVF=60%, so the strength of the composite layer is 2,400 MPa. Consequently the TSC=2,400 MPa. This means that:

$\Sigma(TSC*t_c)_{composite\ layers}$=2,400*0.15*2=720 MPa mm.

Consequently:

$P_{strap}=\Sigma(TUS*t_m)_{metal\ layers}+\Sigma(TSC*t_c)_{composite\ layers}$=352+720=1072 MPa mm.

This results in that the strap has adequate strength:

$P_{strap}>1.2\ P_{spliced\ layer}$

Figure 15:
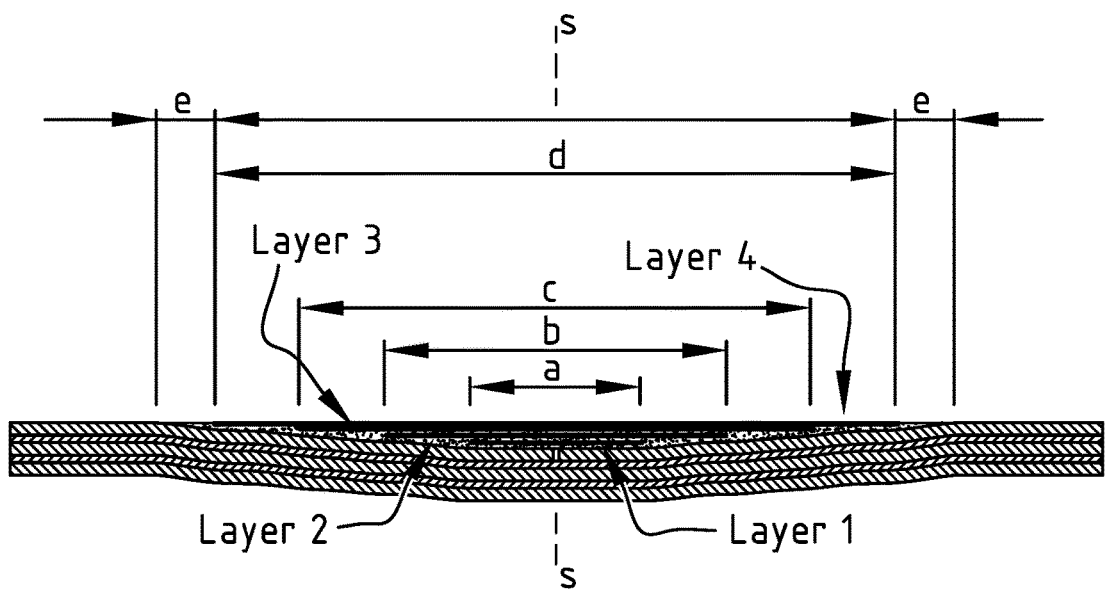
FIG. 15—is a cross-sectional view in a transverse direction of a fiber-metal laminate according to an embodiment of the present invention.

Applying this requirement to the example according to FIG. 15 gives for the bending stiffness of the spliced layer:

$(E*t^3)_{spliced\ layer}$110*0.8³=56.32 GPa mm³

Whereby the $E_{titanium}$=110 GPa

The bending stiffness of the strap will be the bending stiffness of layer4, since it is the widest strap over the splice, i.e.

$(E*t^3)_{strap}$=72.4*0.4³=4.64 GPa mm³

Whereby the $E_{aluminium}$=72.4 GPa.

So this strap configuration fulfils the requirements required by this invention.

For purpose of understanding it is now assumed that all layers (1-4) in FIG. 15 have the same width.

In this case the bending stiffness will be determined by first determining the average E-modulus $E_{strap}=\Sigma(E_i*t_i)/\Sigma t_i$ The stiffness of the applied Carbon fibre is 230 GPa, with the applied FVF=60% the stiffness of the LTD layer will be $E_c$=138 GPa. So:

$E_{strap}$=(138*0.15*2+72.4*0.4*2)/(0.15*2+0.4*2)= 90.29 GPa

Consequently:

$(E*t^3)_{strap}$=90.29*1.1³=120.2 GPa mm³

So the bending stiffness of this strap is more than twice the bending stiffness of the splice layer and therefore this strap does not fulfil the requirement according to the invention.

Specimen Configurations

Two basic series of spliced laminates were tested. A first series comprises aluminum sheets with t=0.5 mm and a second series has aluminum sheets with t=1.3 mm. In both series, the applied aluminum is a 2024-T3 alloy (TUS=440 MPa and E=72.4 GPa). In applicable exemplary laminates, the applied composite layers in the strap are UD-glass prepreg with t=0.13 mm, $E_{glass}$ fibre=88 GPa, the strength of the glass fibre is 4,890 MPa and the prepreg layer has a fiber volume fraction FVF=57%. All specimens are flush at the strap side of the laminate structure, unless otherwise indicated. In exemplary laminates wherein a staggered strap was applied, the stagger is inside-out, meaning that the widest strap layer is at an innermost position, relative to the laminate.

Spliced Laminates with Applied Metal Thickness of t=0.5 mm

Overlap Splice

Figure 14:
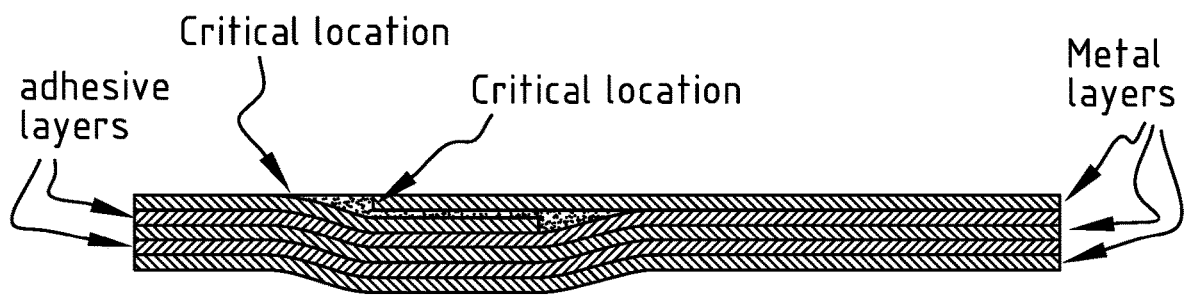
FIG. 14—is a cross-sectional view in a transverse direction of a fiber-metal laminate according to the state of the art having an overlap splice in the uppermost metal layer.

Specimen O-0.5-1: this specimen is a basic laminate having three aluminium layers and two fiber reinforced layers, as shown in FIG. 14.

Specimen O-0.5-2: this specimen has a strap of a 2024-T3 aluminum alloy with a thickness of t=0.5 mm bonded over the spliced area of the laminate of FIG. 14.

Specimen O-0.5-3: this specimen has a strap of a 2024-T3 aluminum alloy with a thickness of t=0.3 mm bonded over the spliced area of the laminate of FIG. 14.

Specimen O-0.5-4: this specimen has a strap consisting of an UD glass prepreg layer adjacent to the spliced metal sheets and attached to it (at the outside) an aluminium 2024-T3 layer with t=0.3 mm having the same width as the glass prepreg layer.

Specimen O-0.5-5: this specimen has a strap equal to specimen O.0.5-4, but with a glass prepreg layer that is wider than the aluminum layer of the strap. At each side, the extension of the glass prepreg layer is 20 mm, which is more than the required $5*t_c$.

Specimen O-0.5-6: this specimen has two glass prepreg layers with different width. The widest strap layer is adjacent to the spliced laminate and has the same extension as for specimen O-0.5-5.

Furthermore, this specimen is not flush at the strap side, but is flush on the opposite side. Specimen O-0.5-7: this specimen has a strap with a glass prepreg adjacent to the spliced laminate and on the outside an aluminum 2024-13 layer of t=0.3 mm attached to it. The aluminium layer is wider than the glass prepreg layer whereby the extension of the aluminium layer on each side is 15 mm, which is significantly more than the required $5*t_{alu}$. Furthermore a small layer of adhesive is applied to fill the gap of 15 mm on each side of the glass prepreg layer.

Specimen B-0.5-4: this specimen has a strap of t=0.3 mm aluminum 2024-T3 bonded over the spliced area.

Specimen B-0.5-5: this specimen a strap with a glass prepreg adjacent to the spliced laminate and on the outside an aluminum 2024-T3 layer of t=0.3 mm attached to it. The aluminum layer is smaller than the glass prepreg layer whereby the extension of the glass prepreg layer on each side is 20 mm, which is significantly more than the required $5*t_c$.

Specimen B-0.5-6*): this specimen has two glass prepreg layers with different width. The widest strap layer is adjacent to the spliced laminate and has the same extension as for specimen B.0.5-3. Furthermore, this specimen is not flush at the strap side, but is flush on the opposite side. Specimen B-0.5-7: this specimen has a strap with a glass prepreg adjacent to the spliced laminate and on the outside an aluminium 2024-T3 layer of t=0.3 mm attached to it the aluminium layer is wider than the glass prepreg layer whereby the extension of the aluminium layer on each side is 15 mm, which is significantly more than the required $5*t_{alu}$. Furthermore a small layer of adhesive is applied to fill the gap of 15 mm on each side of the glass prepreg layer.

Table 1 summarizes the relevant parameters of the tested spliced laminate configurations.

Table 2 summarizes spliced laminate configurations according to embodiments of the invention (Overall Yes) and those that are part of the state of the art (Overall No). Specimens for which the last column indicates Overall NA are the basic splice laminates.

TABLE 2

0.5 mm basic laminate
parameter values for spliced laminates having 0.5 mm thick metal sheets.

| | strap | meeting requirements | | | |
|---|---|---|---|---|---|
| specimen | strap configuration | $P_{strap} > P_{sl}$ | $t_{sl} < c\sqrt[3]{\frac{1}{E_{sl}^*}}$ | $(E^*t^3)\text{strap} < (E^*t^3)\text{sl}$ | Overall |
| O-0.5-1 | Basic laminate | NA | NA | NA | NA |
| O-0.5-2 | 0.5 mm bonded | NA | Yes | No | No |
| O-0.5-3 | 0.3 mm bonded | NA | Yes | Yes | Yes |
| O-0.5-4 | 0.3 mm + pp same length | NA | Yes | Yes | Yes |
| O-0.5-5 | 0.3 mm + pp extended | NA | Yes | Yes | Yes |
| O-0.5-6 *) | 2x prepreg different length | NA | Yes | Yes | Yes |
| O-0.5-7 | 0.3 mm + pp shorter extended w adhesive | NA | Yes | Yes | Yes |
| B-0.5-1 | Basic laminate | NA | NA | NA | NA |
| B-0.5-2 | 0.5 mm bonded | No | NA | No | No |
| B-0.5-3 | 0.3 mm + pp same length | Yes | NA | Yes | Yes |
| B-0.5-4 | 0.3 mm bonded | No | NA | Yes | No |
| B-0.5-5 | 0.3 mm + pp extended | Yes | NA | Yes | Yes |
| B-0.5-6 *) | 2x prepreg different length | Yes | NA | Yes | Yes |
| B-0.5-7 | 0.3 mm + pp shorter extended w adhesive | Yes | NA | Yes | Yes |

Figure 13:
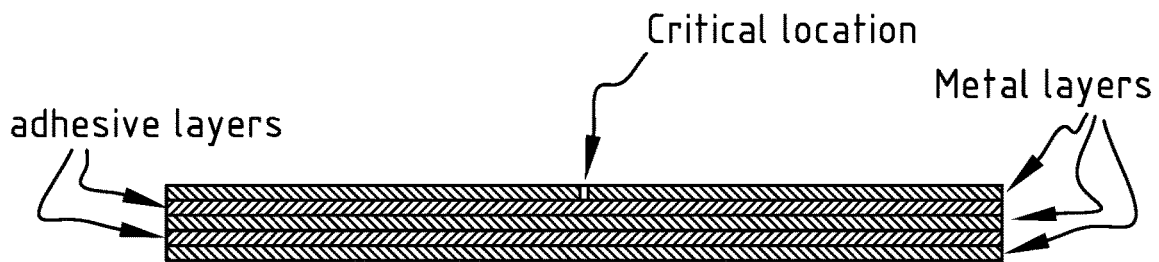
FIG. 13—is a cross-sectional view in a transverse direction of a fiber-metal laminate according to the state of the art having a butted splice in the uppermost metal layer.

Remarks
index sl means spliced layer; example $P_{sl}$ means $P_{spliced\ layer}$
$C_s = 0.6$ for overlap splice
$C_s = 1.2$ for butt splice Butt Splice Specimen B-0.5-1: this specimen is the basic laminate as is shown in FIG. 13.

Specimen B-0.5-2: this specimen has a strap of a 2024-T3 aluminum alloy with a thickness of t=0.5 mm bonded over the spliced area of the laminate.

Specimen B-0.5-3: this specimen has a strap consisting of an UD glass prepreg layer adjacent to the spliced metal sheets and attached to it (at the outside) an aluminium 2024-T3 layer with t=0.3 mm having the same width as the glass prepreg layer.

Figure 16:
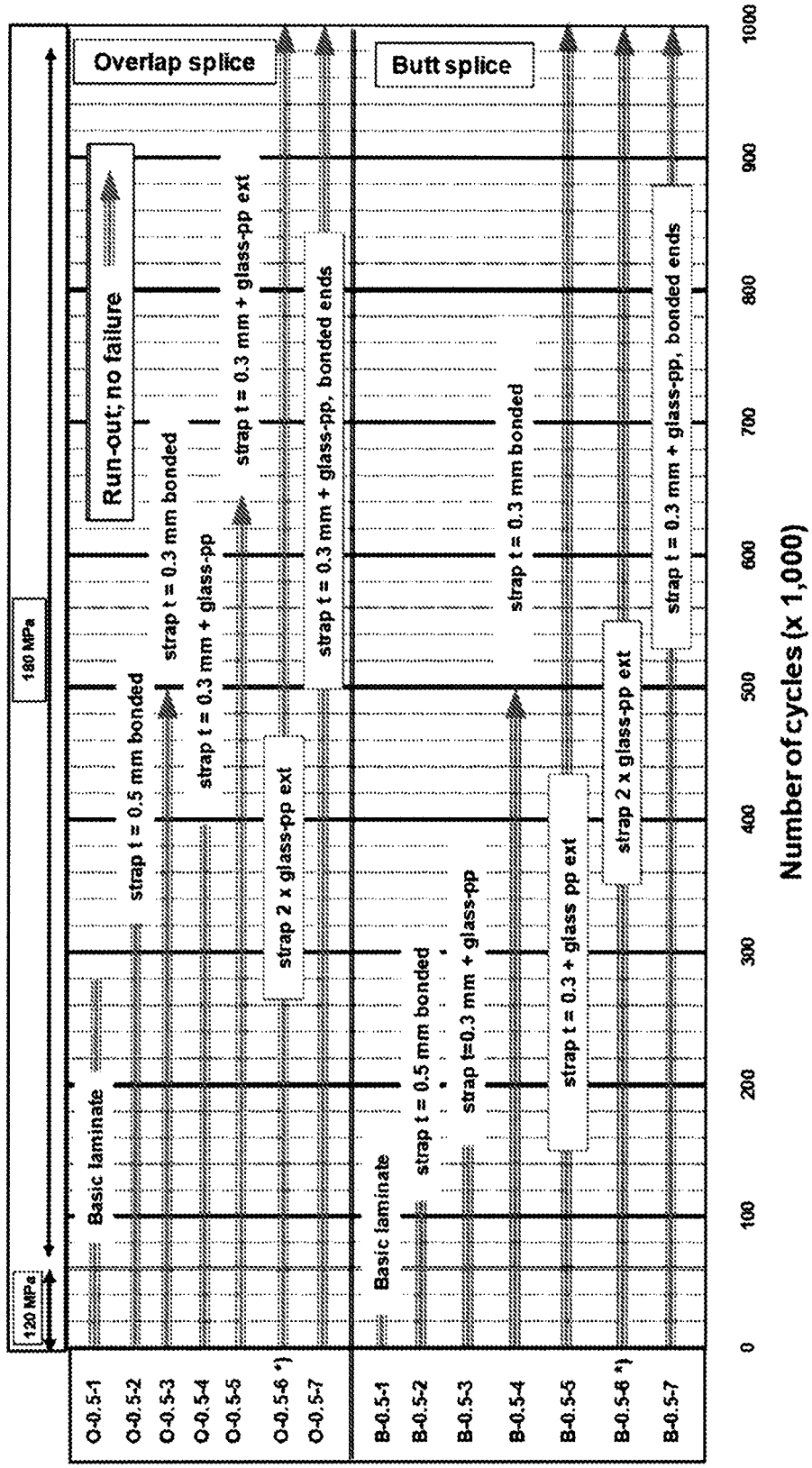
FIG. 16—is a graph showing fatigue test results of spliced laminates having 2024-T3 aluminum sheets with a thickness of 0.5 mm.

Fatigue tests were performed on the laminates with R=0.1 (R=maximumload divided by minimum load) at a maximum tensile load of 120 MPa for about 60,000 cycles, whereafter the load was increased to 180 MPa and held at this level until failure. The tests have been continued up to first cracking or delamination or stopped after a high number of cycles (above 500,000 cycles). The fatigue test results of the above configurations are shown in FIG. 16.

The overlap splice configurations with aluminum layer thicknesses of t=0.5 mm fulfil the requirement with respect to the stiffness of the splice metal sheets since this requires $t_{spliced\ layer}$<1.08 mm. The specimens O-0.5-2 and B-0.5-2 do not meet the claimed requirements and therefore represent state of the art laminates. Specimen B-0.5-4 is less preferred since it does not meet the strength requirement. The specimens that do not meet the claimed bending stiffness ratio requirement show hardly to no fatigue improvement at all. The fatigue results of B-0.5-4 and B-0.5-3 show that the most preferred bending stiffness ratio of <0.50 shows the best fatigue performances.

Spliced Laminates with Applied Metal Thickness of t=1.3 mm

Overlap Splice

Specimen O-1.3-1: this specimen is the basic overlap laminate as is shown in FIG. 14. Specimen O-1.3-2: this specimen has a strap consisting of an UD glass prepreg layer adjacent to the spliced metal sheets of the laminate and on the outside an aluminium 2024-T3 layer with t=1.0 mm having the same width of the glass prepreg.

Butt Splice

Specimen B-1.3-1: this specimen is the basic butt splice laminate as is shown in FIG. 13

Specimen B-1.3-2: this specimen has a strap of aluminum 2024-T3 with t=1.3 mm bonded to the spliced aluminium layers Specimen B-1.3-3: this specimen has a strap consisting of an aluminum 2024-T3 layer t=0.3 mm bonded to the spliced metal layers. On top of this aluminum layer an UD glass prepreg layer with a smaller width than this aluminium layer is placed. The UD prepreg layer is on both sides 20 mm smaller than the underlying aluminum layer (thereby fulfilling easily the requirement of $5*t_{tot}$; $t_{tot}$ =0.3+0.13=0.43 mm)

Specimen B-1.3-4: this specimen has a strap consisting of 2 layers of aluminium 2024T3 with t=0.3 mm. Between these layers is placed an UD glass prepreg and this total package is connected to the splice metal sheets of the laminate by another UD glass prepreg layer of the same width as the adjacent aluminium sheet of the strap. The two aluminium layers of the strap and the glass prepreg layer in between these aluminium layers are staggered. So the UD glass prepreg layer adjacent to the spliced metal sheets and the aluminium on top of it have the same width the UD glass prepreg layer on top of the aluminium layer has a smaller width than this aluminium layer the width reduction is on both sides 15 mm. On top of this prepreg layer is placed the aluminium layer with a reduced width compared to the adjacent UD glass prepreg. The reduction is at both sides also 15 mm. In both cases the requirement of 5*t is met.

Specimen B-1.3-5: this specimen has a strap of equal shape as specimen B-1.3-4. The main difference is that the prepreg layer adjacent to the spliced metal sheets is extended to the aluminium sheet op top of it. The extension is at both end of the prepreg 20 mm.

Specimen B-1.3-6*): this specimen is in configuration the same as the previous specimen B-1.3-5, with one exception. This specimen is non flush on the strap side, but flush on the opposite side.

Table 1 summarizes the relevant parameters of the tested spliced laminate configurations.

TABLE 1 stiffness and strength parameters of the tested spliced laminate configurations

| specimen | strap configuration | strap end of strap $Et^3_{str}/Et^3_{spl}$ | strength $P_{strap}/P_{spliced\ layer}$ |
|---|---|---|---|
| 0.5 mm basic laminate | | | |
| O-0.5-1 | Basic laminate | | |
| O-0.5-2 | 0.5 mm bonded | 1.000 | 1.00 |
| O-0.5-3 | 0.3 mm bonded | 0.216 | 0.60 |
| O-0.5-4 | 0.3 mm + pp same length | 0.577 | 2.25 |
| O-0.5-5 | 0.3 mm + pp extended | 0.012 | 2.25 |
| O-0.5-6 *) | 2 × prepreg different length | 0.012 | 3.29 |
| O-0.5-7 | 0.3 mm + pp shorter extended w adhesive | 0.216 | 2.25 |
| B-0.5-1 | Basic laminate | | |
| B-0.5-2 | 0.5 mm bonded | 1.000 | 1.00 |
| B-0.5-3 | 0.3 mm + pp same length | 0.577 | 2.25 |
| B-0.5-4 | 0.3 mm bonded | 0.216 | 0.60 |
| B-0.5-5 | 0.3 mm + pp extended | 0.024 | 2.81 |
| B-0.5-6 *) | 2 × prepreg different length | 0.012 | 3.29 |
| B-0.5-7 | 0.3 mm + pp shorter extended w adhesive | 0.216 | 2.25 |
| 1.3 mm basic laminate | | | |
| O-1.3-1 | Basic laminate | | |
| O-1.3-2 | 1.0 mm + pp | 0.634 | 1.40 |
| B-1.3-1 | Basic laminate | | |
| B-1.3-2 | 1.3 mm bonded | 1.000 | 1.00 |
| B-1.3-3 | 2 × 0.3 mm + pp, bonded | 0.012 | 1.10 |
| B-1.3-4 | 2 × 0.3 mm + 1 pp ext | 0.033 | 1.73 |
| B-1.3-5 | 2 × 0.3 mm + 2*pp ext | 0.001 | 1.73 |
| B-1.3-6 *) | 2 × 0.3 mm + 2*pp ext | 0.001 | 1.73 |

Remarks:
all specimens are flush on the strap side, except specimens marked *) which are flush on the opposite side
O = Overlap splice
B = Butted splice Table 3 summarizes spliced laminate configurations according to embodiments of the invention (Overall Yes) and those that are part of the state of the art (Overall No). Specimens for which the last column indicates Overall NA are the basic splice laminates.

TABLE 3

1.3 mm basic laminate
parameter values for spliced laminates having 1.3 mm thick metal sheets.

| | strap | | meeting requirements | | |
|---|---|---|---|---|---|
| specimen | strap configuration | $P_{strap} > P_{sl}$ | $t_{sl} < c \sqrt[3]{\frac{1}{E_{sl}}}$ | $(E*t^3)strap < (E*t^3)sl$ | Overall |
| O-1.3-1 | Basic laminate | NA | NA | NA | NA |
| O-1.3-2 | 1.0 mm + pp | NA | No | Yes | No |
| B-1.3-1 | Basic laminate | NA | NA | NA | NA |
| B-1.3-2 | 1.3 mm bonded | No | NA | No | No |
| B-1.3-3 | 2 × 0.3 mm + pp, bonded | No | NA | Yes | No |
| B-1.3-4 | 2 × 0.3 mm + 1 pp ext | Yes | NA | Yes | Yes |

TABLE 3-continued 1.3 mm basic laminate
parameter values for spliced laminates having 1.3 mm thick metal sheets.

| | strap | | meeting requirements | | |
|---|---|---|---|---|---|
| specimen | strap configuration | $P_{strap} > P_{sl}$ | $t_{sl} < c \sqrt[3]{\frac{1}{E_{sl}}}$ | $(E*t^3)strap < (E*t^3)sl$ | Overall |
| B-1.3-5 | 2 × 0.3 mm + 2*pp ext | Yes | NA | Yes | Yes |
| B-1.3-6 *) | 2 × 0.3 mm + 2*pp ext | Yes | NA | Yes | Yes |

Figure 17:
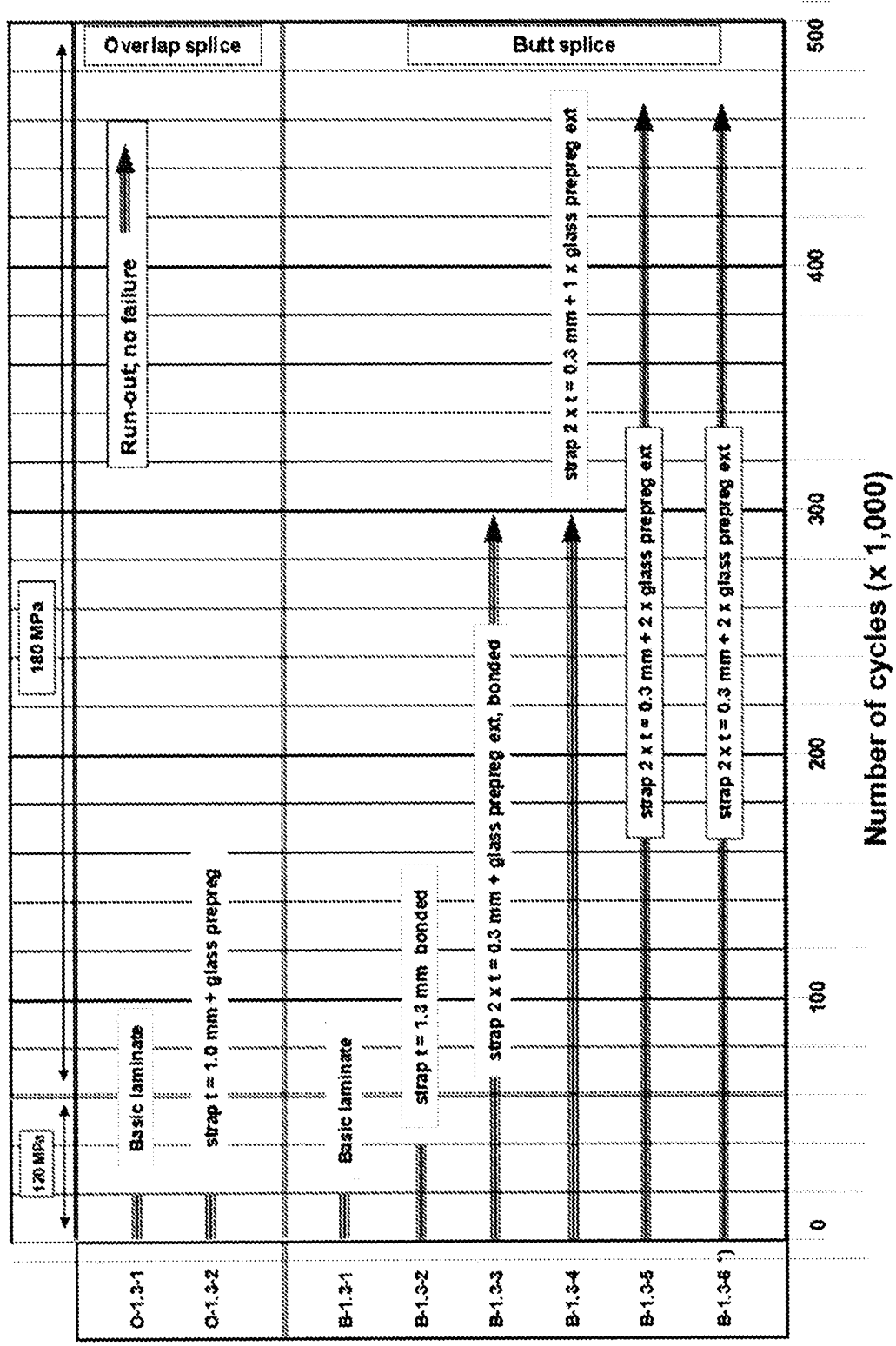
FIG. 17—is a graph showing fatigue test results of spliced laminates having 2024-T3 aluminum sheets with a thickness of 1.3 mm.

Remarks
index sl means spliced layer; example $P_{sl}$ means $P_{spliced\ layer}$
$C_s$ = 0.6 for overlap splice
$C_s$ = 1.2 for butt splice FIG. 17 illustrates the fatigue results obtained on the different laminate configurations having spliced aluminium layers of 1.3 mm thick sheets. The fatigue results show that the fatigue performance of the basic overlap splice is about equal to the performance of the basic butt splice configurations.

Overlap spliced laminates with a metal sheet thickness of t=1.3 mm do not meet the bending stiffness requirement of the metal sheets, since this would require that $t_{spliced\ layer}$<1.08 mm. The spliced layer has a thickness of t=1.3 mm and such laminates are less preferred. The specimens B-1.3-2 and B-1.3-3 do not fulfil all requirements. Specimen B-1.3-2 corresponds to a state of the art laminate and specimen B-1.3-3 is less preferred since the strength requirement is not met. The remaining specimens B-1.3-4 to B-1.3-6*) meet all requirements and show consequently very good fatigue results. These specimens are preferred.

The invention claimed is:

1. A laminate comprising a stack of mutually bonded layers of adhesive and metal sheets, the laminate comprising spliced metal sheets with abutting or overlapping metal sheet edges that extend along a length direction within a splicing region, wherein a splice strap is connected to the laminate at and over an outer surface of the laminate and extending in the length direction across said splicing region over a certain width in a transverse direction perpendicular to the length direction, the splice strap comprising a layer of fiber-reinforced adhesive, or stacked layers of fiber-reinforced adhesive and metal sheets, wherein a widest splice strap layer is connected to the laminate over a transverse distance of at least 5 times the widest strap layer thickness, and the widest strap layer has a lower bending stiffness $(E*t^3)_{strap\ layer}$ than the bending stiffness $(E*t^3)_{spliced\ layer}$ of one of the spliced metal sheets $$(E*t^3)_{strap\ layer} < (E*t^3)_{spliced\ layer}$$

and wherein further $E_{strap\ layer}$>10 GPa.

2. Laminate according to claim 1, wherein the bending stiffness of the splice strap layer and the spliced metal sheet is the bending stiffness in the transverse direction.

3. Laminate according to claim 1, wherein $(E*t^3)_{strap\ layer}$<0.9 $(E*t^3)_{spliced\ layer}$.

4. Laminate according to claim 1, wherein the tensile strength $P_{strap}$ of the total strap layer is larger than 0.6 times the tensile strength of one of the spliced metal sheets $P_{spliced\ layer}$.

5. Laminate according to claim 4, wherein the laminate comprises spliced metal sheets with overlapping metal sheet edges.

6. Laminate according to claim 4, wherein the tensile strength $P_{strap}$ of the total strap layer is larger than the tensile strength of one of the spliced metal sheets $P_{spliced\ layer}$.

7. Laminate according to claim 1, wherein the bending stiffness $(E*t^3)_{spliced\ layer}$ of one of the spliced metal sheets is lower than 90 GPa mm$^3$.

8. Laminate according to claim 7, wherein the laminate comprises spliced metal sheets with abutting metal sheet edges.

9. Laminate according to claim 1, wherein the splice strap comprises a metal sheet layer that is connected to the laminate with a layer of fiber-reinforced adhesive.

10. Laminate according to claim 1, wherein an outer surface of the splice strap is flush with the outer surface of the laminate.

11. Laminate according to claim 1, wherein splice strap layers each have a width in the transverse direction across the splicing region, and the width of the layers decreases over the splice strap thickness towards the laminate to form staggered layers.

12. Laminate according to claim 1, wherein the splice strap comprises a tapered edge over a tapered transverse distance, and the splice strap has a lower bending stiffness than the bending stiffness of one of the spliced metal sheets, whereby the bending stiffness of the splice strap is evaluated by taking the thickness equal to the mean thickness across the tapered transverse distance.

13. Laminate according to claim 1, wherein the modulus of elasticity of the widest splice strap layer $E_{strap\ layer}$>15 GPa.

14. Laminate according to claim 1, wherein splice strap layers each have a width in the transverse direction across the splicing region, and the width of the layers is equal over the splice strap thickness, wherein the splice strap has a lower bending stiffness than the bending stiffness of one of the spliced metal sheets.

15. Laminate according to claim 1, further comprising a bonded second splice strap extending in the length direction across said splicing region and positioned within the laminate stack, or being positioned adjacent to the spliced metal sheets and at a side of the spliced metal sheets that is opposite to the outer surface of the laminate.

16. Laminate according to claim 1, wherein the splicing region comprises deformed metal sheets.

17. Laminate according to claim 16, wherein the deformed metal sheets are bend along a line parallel to the length direction.

18. Laminate according to claim 1, wherein the outer surface of the laminate is substantially smooth and a second outer surface opposite said outer surface is curved.

19. Laminate according to claim 1, wherein the adhesive layers comprise reinforcing fibers to form a fiber-metal laminate.

20. Structural component for a vehicle, spacecraft, or aircraft, comprising a laminate according to claim 1.

* * * * *

UNITED STATES PATENT AND TRADEMARK OFFICE
CERTIFICATE OF CORRECTION

PATENT NO. : 10,792,893 B2  
APPLICATION NO. : 15/760385  
DATED : October 6, 2020  
INVENTOR(S) : Jan Willem Gunnink et al.

Page 1 of 1

It is certified that error appears in the above-identified patent and that said Letters Patent is hereby corrected as shown below:

On the Title Page

Item (71) Applicant, Line 2, Delete "s-Gravenhage" and insert -- 's-Gravenhage --

In the Claims

Column 20, Line 63, Claim 17, after "sheets" delete "are"

Signed and Sealed this  
Thirteenth Day of April, 2021

Drew Hirshfeld  
*Performing the Functions and Duties of the  
Under Secretary of Commerce for Intellectual Property and  
Director of the United States Patent and Trademark Office*